April 29, 1969 J. A. McDONALD ET AL 3,441,790
STABILIZATION OF TELEVISION DEFLECTION CIRCUITS
Filed Nov. 15, 1965
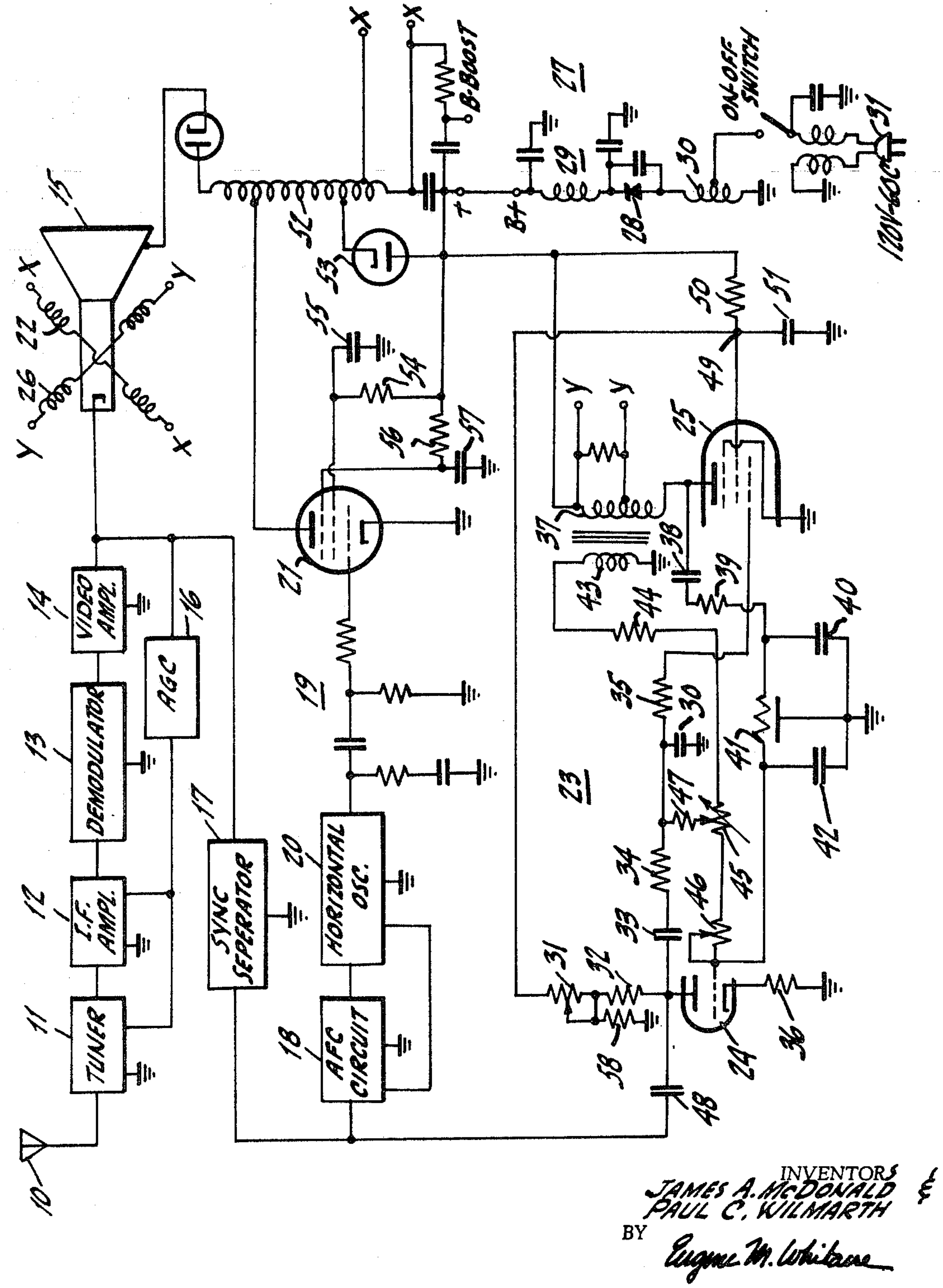
INVENTORS
JAMES A. McDONALD &
PAUL C. WILMARTH
BY
Eugene M. Whitacre
Attorney United States Patent Office 3,441,790
Patented Apr. 29, 1969

3,441,790

STABILIZATION OF TELEVISION DEFLECTION CIRCUITS

James A. McDonald and Paul C. Wilmarth, Indianapolis, Ind., assignors to Radio Corporation of America, a corporation of Delaware Filed Nov. 15, 1965, Ser. No. 507,926
Int. Cl. H01j *29/70*
U.S. Cl. 315—27 5 Claims

ABSTRACT OF THE DISCLOSURE

Means are provided for maintaining the aspect ratio of a television image substantially constant despite variations in power line voltage. Filtering means are provided for direct voltages applied to the linearity control and to the screen grid of the output stage of the vertical deflection circuit. The time-constant of the filtering means is selected such that variations in image height resulting from line voltage variations are reduced so as to be in substantially the same proportion with respect to variations in image width as the normal aspect ratio.

This invention relates to television receiver circuits, and more particularly, to means for stabilizing the deflection circuits of a television receiver against variations or disturbances of power line voltage.

In a television receiver, images are produced on the screen of a cathode ray tube by scanning an electron beam in a regular pattern across the screen and simultaneously varying the electron beam current according to variations in the brightness of the image which is to be reproduced. In general, commercial television receivers utilize electromagnetic deflection means for scanning the electron beam over the screen of the cathode ray tube in both the horizontal and vertical directions. Without some form of compensation, variations of power line voltage supplied to a receiver result in variations in the amplitude of deflection signals produced by the deflection circuits and therefore cause changes in the height or width, as the case may be, of the image produced on the screen of the cathode ray tube.

In many present day commercial television receivers, energy is supplied to the vertical deflection windings from a self-oscillating circuit, the typical circuit including an oscillator stage and an amplifier or output stage, the amplifier stage serving to supply an amplified sawtooth waveform to the vertical deflection windings. In such a circuit, the B+ supply voltage (or some voltage derived therefrom) customarily is applied in the amplifier stage to one or more grids with which amplification factors are associated. Variations in power line voltage which result in variations in B+ supply voltage therefore are amplified in the amplifier stage and result in substantial variations in image height. A typical horizontal deflection circuit, on the other hand, may be considered as a switch for applying the B+ voltage (or some voltage such as "boosted B+" derived therefrom) directly across the horizontal deflection windings. Variations in line voltage appear substantially directly across the horizontal winding, rather than appearing in amplified form, and therefore produce a variation in image width relatively smaller than the corresponding variation in image height. The problem outlined above is of particular concern in television receivers designed for operation from a B+ supply voltage having a relatively high ripple factor. A B+ supply voltage with a high ripple factor is substantially more sensitive to a number of commonly encountered causes of variations in line voltage than is a full-wave rectified supply voltage.

In accordance with the present invention means are provided for reducing substantially the effect of power line voltage variations on the height of the television image. Particularly, means are provided for maintaining the aspect ratio (width/height) of the television image substantially constant despite variations in power line voltage.

The present invention is characterized in that additional filtering means are provided for selected direct voltages which are applied to the output stage of a vertical deflection circuit, the filtering means being selected such that variations in image height resulting from power line voltage variations are reduced so as to be in substantially the same proportion with respect to variations in image width as the normal image aspect ratio.

The novel features that are considered characteristic of this invention are set forth with particularity in the appended claims. The invention itself, however, both as to its organization and method of operation, as well as objects and advantages thereof, will best be understood from the following description when read in connection with the accompanying drawing, in which the sole figure is a schematic circuit diagram, partially in block diagram form, of the image reproducing portion of a television receiver having horizontal and vertical deflection circuit components proportioned for stabilization in accordance with the present invention.

Referring to the drawing, the television receiver includes an antenna 10 for receiving composite television signals and for coupling such signals to a television receiver tuner 11. The tuner 11 normally includes one or more radio frequency (R-F) amplifier stages tunable to a plurality of frequencies corresponding to television broadcast carrier signals. Tuner 11 further includes a frequency converter for converting radio frequency signals into intermediate frequency (I-F) signals. The receiver further includes an intermediate frequency amplifier 12 and a demodulator 13, the latter serving to derive composite television video signals from the intermediate frequency signals. A video amplifier 14 coupled to the output of demodulator 13 supplies amplified composite video signals representative of an image to be displayed to a control electrode of a television kinescope 15. The output of video amplifier 14 also is coupled to an AGC circuit 16, the latter in turn being coupled to the R-F amplifier stages in tuner 11 and to the I-F amplifier 12 to control the gain thereof. The amplified composite video television signals also are coupled from video amplifier 14 to a synchronizing signal separator circuit 17. Sync separator circuit 17 separates the horizontal and vertical deflection synchronizing signals from the remainder of the composite video signal. The separated horizontal synchronizing pulses are applied from sync separator circuit 17 by means of a suitable time constant circuit (not shown) to an automatic frequency control (AFC) circuit 18. AFC circuit 18 is coupled to a horizontal deflection waveform generating circuit 19 which includes a horizontal oscillator 20 and a horizontal output stage 21. The output terminals X—X of horizontal output stage 21 are coupled to the similarly labelled terminals X—X of a horizontal deflection winding 22 associated with kinescope 15.

Vertical synchronizing pulses are supplied from sync separator circuit 17 by means of an additional time constant network (not shown) to a vertical deflection waveform generating circuit 23 which includes a vertical oscillator stage 24 and a vertical output stage 25. The output terminals Y—Y of vertical output stage 25 are coupled to the similarly labelled terminals Y—Y of a vertical deflection winding 26 associated with kinescope 15.

A relatively low B+ voltage supply 27 is provided in the receiver for producing a direct voltage of, for example, 170 volts from the alternating 120 volt power line voltage. The B+ voltage supply 27 comprises a half-wave rectifier circuit including a rectifier 28 and an L-C filter circuit 29. A step-up autotransformer 30 is coupled between the line plug 31 and the rectifier 28 to provide a higher alternating voltage than may be obtained directly from the power line.

The circuit elements of the horizontal and vertical deflection circuits 19 and 23 to which the present invention relates now will be described in further detail.

Vertical oscillator 24 and vertical output stage 25 may be constructed, for example, utilizing the triode and pentode sections respectively of a tube such as RCA Type 15KY8. As is customary in circuits of this type a substantially sawtooth voltage waveform is produced across capacitor 30, the charging path including a linearity control variable resistor 31, a fixed resistor 32, a coupling capacitor 33 and a second fixed resistor 34. The sawtooth voltage is coupled from capacitor 30 by means of a resistor 35 to the control grid of output stage 25. The plate electrode of oscillator stage 24 is coupled to the junction of resistor 32 and capacitor 33 to provide a discharge path for sawtooth capacitor 30 through a cathode resistor 36. The plate electrode of output stage 25 is coupled to the B+ voltage supply (170 v.) by means of an output transformer winding 37. Plate current variations which are produced in output stage 25 as a result of the sawtooth drive voltage applied to the grid thereof flow through the transformer winding 37 to produce in vertical deflection winding 26 (coupled to terminals Y—Y) the required sawtooth deflection current waveform.

Oscillations are maintained in the vertical deflection circuit by means of positive feedback from the plate of output stage 25 to the grid of oscillator 24 via a pulse shaping network comprising capacitor 38, resistor 39 and a distributed resistance-capacitance network including capacitance 40, resistance-capacitance 41 and capacitance 42. A second feedback path is provided for producing a parabolic voltage waveform to modify the signal applied to the control grid of oscillator 24. The second feedback path comprises a transformer winding 43 inductively coupled to transformer winding 37, a resistor 44, a variable resistance height control 45 and a variable resistance hold control 46. The movable contact of height control 45 is coupled by means of a resistor 47 to the junction of resistors 34 and 35 to control the bias applied to the control grid of output stage 25. The frequency of oscillation of oscillator 24 is adjusted by means of hold control 46. After initial adjustment of hold control 46, the oscillation frequency is maintained by means of vertical synchronizing pulses supplied from synchronizing signal separator circuit 17 to the grid of output stage 25 via capacitors 48 and 33. The amplitude of the sawtooth drive voltage supplied by oscillator 24 and thereby the waveform shape of the output of pentode 25 may be adjusted by means of the variable linearity control resistor 31, one end of which is returned to a positive voltage supply at terminal 49 and the other end of which is returned to ground by resistor 58. The voltage present at terminal 49 is derived from the B+ supply voltage but is filtered additionally, in accordance with the present invention, by means of the relatively long time-constant combination of resistor 50 and relatively large capacitor 51 (e.g. of the order of 50–100 microfarads).

The screen grid of vertical output stage 25 is also supplied at terminal 49 with the filtered direct voltage in accordance with the present invention.

In horizontal deflection circuit 19, sawtooth drive current is produced in horizontal deflection winding 22 substantially by coupling the B boost voltage directly across horizontal output transformer 52 during the trace portion of each horizontal deflection cycle by means of the combined switching action of damper diode 53 and horizontal output stage 21. The screen grid of horizontal output stage 21 is supplied with a positive voltage by means of a relatively short time constant bypass network including resistor 54 and a relatively small capacitor 55. A positive voltage is applied by means of resistor 56 and capacitor 57 to the suppressor electrode of output stage 21 to prevent undesirable oscillations in that circuit.

In the operation of the television receiver shown in FIGURE 1, the B+ supply voltage produced at the output of filter 29 is highly sensitive to variations in line voltage because of the relatively high ripple factor present in the D-C voltage from the supply 27. The design of the horizontal output stage is such that variations in the B+ supply voltage resulting from such variations in line voltage are not amplified in horizontal deflection circuit 19 but rather appear across the horizontal deflection winding 22 as a proportional change. In the vertical deflection circuit 23, variations in the B+ supply voltage produce variations both in the sawtooth voltage applied to the control grid of output pentode 25 and in the voltage applied to the screen grid of output pentode 25. Amplification factors are associated with each of these grids and any voltage variation appearing at such grids results in a substantially greater variation in the deflection signal applied to vertical deflection winding 26. In accordance with the present invention, the voltage supplied at terminal 49 to the screen grid of output pentode 25 and to linearity control 31 are filtered by means of the combination of resistor 50 and capacitor 51 to produce in the deflection signal applied to vertical winding 26 a change which is proportional to the change produced in the horizontal deflection signal so as to maintain the image aspect ratio substantially constant. In this manner the overall image disturbance is least noticeable.

In practice, the time constant of the filter circuit comprising resistor 50 and capacitor 51 may be selected by visual observation of the effect on image aspect ratio of line voltage variations, the value of such time constant being determined by the performance characteristics of the particular associated horizontal deflection circuit 19.

The B+ supply voltage applied to the plate electrode of vertical output pentode 25 need not be filtered additionally since substantially all of the variations which occur in the B+ supply voltage appear across the high impedance pentode rather than across the relatively low impedance plate load, i.e. the vertical deflection winding 26.

A circuit of the type shown in FIGURE 1 in which the advantages of the present invention are realized may be constructed utilizing the following components:

| | |
|---|---|
| Horizontal output stage 21 | RCA type 22JU6. |
| Vertical oscillator stage 24 | Triode of 15KY8. |
| Vertical output stage 25 | Pentode of 15KY8. |
| B+ half-wave voltage supply 27 | +170 volts. |
| Capacitor 30 | .022 microfarads. |
| Linearity control 31 | 500,000 ohms. |
| Resistor 32 | 470,000 ohms. |
| Capacitor 33 | .033 microfarads. |
| Resistor 34 | 22,000 ohms. |
| Resistor 35 | 1,000 ohms. |
| Resistor 36 | 3,300 ohms. |
| Capacitor 38 | .0027 microfarads. |
| Resistor 39 | 27,000 ohms. |
| Capacitor 40 | 190 micro-microfarads. |
| Resistor-capacitor 41 | 68,000 ohms, .0018 microfarads. |
| Capacitor 42 | .001 microfarads. |
| Resistor 44 | 100,000 ohms. |
| Height control 45 | 350,000 ohms. |
| Hold control 46 | 750,000 ohms. |
| Resistor 47 | 1.8 megohms. |
| Capacitor 48 | .0039 microfarads. |
| Resistor 50 | 3,300 ohms. |
| Capacitor 51 | 60 microfarads. |
| Resistor 54 | 3,300 ohms. |
| Capacitor 55 | .033 microfarads. |
| Resistor 56 | 27,000 ohms. |
| Capacitor 57 | .01 microfarads. |
| B boost supply | +320 volts. |

What is claimed is:

1. In a television receiver having an image-reproducing cathode ray tube and a horizontal deflection circuit for periodically deflecting an electron beam across the face of the cathode ray tube, a vertical deflection circuit comprising a sawtooth capacitor, charging circuit means for said sawtooth capacitor, an electron tube having an input electrode, an output electrode and at least one additional electrode, means for applying a voltage produced across said sawtooth capacitor to said input electrode, a vertical deflection winding coupled to said output electrode, a source of direct voltage susceptible to variations, and means for direct current coupling said direct voltage source to said charging circuit means and to said additional electrode, said coupling means comprising filtering means having a fixed time constant selected for varying vertical image size with respect to horizontal image size in proportion to the aspect ratio of the image produced on the cathode ray tube as said direct voltage varies.

2. A vertical deflection circuit according to claim 1 wherein said charging circuit means includes a variable resistance coupled in circuit with said filtering means and with said sawtooth capacitor for varying the amplitude of the voltage produced across said sawtooth capacitor.

3. A vertical deflection circuit according to claim 2 wherein said electron tube consists of a pentode amplifier tube, said input, output and additional electrodes comprise, respectively, the control grid, plate and screen grid of said pentode amplifier tube and said vertical deflection circuit further comprises a discharging electron tube coupled to said sawtooth capacitor for discharging said capacitor periodically.

4. A vertical deflection circuit according to claim 3 wherein said filtering means comprises a resistance-capacitance combination, the time-constant of said combination being selected with reference to operating characteristics of the horizontal deflection circuit so as to maintain the aspect ratio of the image produced on the cathode ray tube substantially constant despite variations in said direct voltage.

5. A vertical deflection circuit according to claim 4 wherein said source of direct voltage is coupled to said plate of said pentode amplifier tube and to said horizontal deflection circuit preceding said filtering means.

References Cited

UNITED STATES PATENTS

| | | | |
|---|---|---|---|
| 2,913,624 | 11/1959 | Freestone | 315—27 |
| 2,543,304 | 2/1951 | Schwarz | 315—27 |

RODNEY D. BENNETT, Jr., *Primary Examiner.*

J. G. BAXTER, *Assistant Examiner.*